United States Patent
Marushak et al.

(10) Patent No.: US 7,418,545 B2
(45) Date of Patent: Aug. 26, 2008

(54) INTEGRATED CIRCUIT CAPABLE OF PERSISTENT RESERVATIONS

(75) Inventors: Nathan E. Marushak, Gilbert, AZ (US); Chet R. Douglas, Tucson, AZ (US)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 10/975,255

(22) Filed: Oct. 28, 2004

(65) Prior Publication Data

US 2006/0095658 A1    May 4, 2006

(51) Int. Cl.
   *G06F 12/00* (2006.01)
(52) U.S. Cl. .............................. 711/112; 710/5; 710/33
(58) Field of Classification Search .................. 711/170, 711/112, 114, 156, 100; 710/5, 33, 100, 710/300, 56, 57
   See application file for complete search history.

(56) References Cited

U.S. PATENT DOCUMENTS

| | | | | |
|---|---|---|---|---|
| 5,499,378 | A * | 3/1996 | McNeill et al. | 703/24 |
| 5,748,924 | A | 5/1998 | Llorens et al. | |
| 5,802,327 | A | 9/1998 | Hawley et al. | |
| 5,892,964 | A | 4/1999 | Horan et al. | |
| 6,286,056 | B1 * | 9/2001 | Edgar et al. | 711/100 |
| 6,480,925 | B1 | 11/2002 | Bodo | |
| 6,601,119 | B1 | 7/2003 | Slutz et al. | |
| 6,654,902 | B1 * | 11/2003 | Brunelle et al. | 711/156 |
| 6,804,703 | B1 | 10/2004 | Allen et al. | |
| 6,965,956 | B1 | 11/2005 | Herz et al. | |
| 6,996,642 | B2 | 2/2006 | Apperley et al. | |
| 7,058,749 | B2 | 6/2006 | Loffink | |
| 7,181,562 | B1 | 2/2007 | Stenfort et al. | |
| 7,206,875 | B2 * | 4/2007 | Marushak et al. | 710/62 |
| 7,313,636 | B2 * | 12/2007 | Qi | 710/5 |
| 2002/0081873 | A1 * | 6/2002 | Harris et al. | 439/79 |
| 2002/0133714 | A1 * | 9/2002 | Sales et al. | 713/200 |
| 2003/0065782 | A1 | 4/2003 | Nishanov et al. | |
| 2003/0163628 | A1 * | 8/2003 | Lin | 710/315 |
| 2003/0188233 | A1 | 10/2003 | Lubbers et al. | |
| 2004/0044800 | A1 | 3/2004 | Krehbiel et al. | |
| 2004/0117522 | A1 | 6/2004 | Loffink et al. | |
| 2004/0117678 | A1 | 6/2004 | Soltis et al. | |

(Continued)

FOREIGN PATENT DOCUMENTS

EP    1246060 A1    10/2002

(Continued)

OTHER PUBLICATIONS

Universal Serial Bus Specification, Revision 2.0, pp. 1-38, Apr. 27, 2000.*

(Continued)

*Primary Examiner*—Pierre-Michel Bataille
(74) *Attorney, Agent, or Firm*—Grossman, Tucker, Perreault & Pfleger, PLLC

(57) ABSTRACT

A method according to one embodiment may include communicating, by an integrated circuit, with at least one target ATA/ATAPI storage device. The method of this embodiment may also include creating, by the integrated circuit, a persistent reservation between at least one target ATA/ATAPI storage device and the integrated circuit. Of course, many alternatives, variations, and modifications are possible without departing from this embodiment.

40 Claims, 4 Drawing Sheets

U.S. PATENT DOCUMENTS

| | | | |
|---|---|---|---|
| 2004/0148460 A1 | 7/2004 | Steinmetz et al. | |
| 2004/0148461 A1 | 7/2004 | Steinmetz et al. | |
| 2004/0205288 A1 | 10/2004 | Ghaffari et al. | |
| 2004/0236908 A1 | 11/2004 | Suzuki et al. | |
| 2004/0267516 A1 | 12/2004 | Jibbe et al. | |
| 2005/0108452 A1 | 5/2005 | Loffink | |
| 2005/0193159 A1 | 9/2005 | Ng et al. | |
| 2005/0193235 A1 | 9/2005 | Sandorfi et al. | |
| 2005/0216604 A1 | 9/2005 | Loffink et al. | |
| 2005/0278465 A1 | 12/2005 | Qi | |
| 2006/0025018 A1 | 2/2006 | Dube et al. | |
| 2006/0031612 A1 | 2/2006 | Bashford et al. | |
| 2006/0041691 A1 | 2/2006 | Bashford et al. | |
| 2006/0095599 A1 | 5/2006 | Douglas et al. | |
| 2006/0095625 A1* | 5/2006 | Wootten et al. | 710/300 |

FOREIGN PATENT DOCUMENTS

| | | | |
|---|---|---|---|
| EP | 1321848 A3 | 3/2005 | |
| EP | 1246060 B1 | 12/2005 | |

OTHER PUBLICATIONS

"PCI Express Based Specification Revision 1.0", PCI Express, Table of Contents, (Jul. 22, 2002), 15 pgs.*

"Serial ATA: High Speed Serialized AT Attachment, Serial ATA Workgroup", Revision 1.0a, Table of Contents, APT Technologies, Inc., (Jan. 7, 2003), 10 pgs.*

"PCI Express Base Specification Revision 1.0", PCI Express, Table of Contents, GTPP Standard # 1,(Jul. 22, 2002),15 pgs.

"PCI-X Addendum to the PCI Local Bus Specification", PCI Special Interest Group: Revision 1.0a, Table of Contents, GTPP Standard # 2,(Jul. 24, 2000),9 pgs.

"American National Standards for Information Technology", Working Draft T10/1675-D MMC-5 Revision 1, GTPP Standard # 27,(Oct. 31, 2004),627 pgs.

"American National Standard for Information Technology", Working Draft SCSI Block Commands—2 (SBC-2), T10/1417-D Revision 14, GTPP Standard # 28,(May 11, 2004),142 pgs.

"American National Standard", Working Draft T13/1532D, vol. 1, Revision 4b, GTPP Standard # 29,(Apr. 21, 2004),390 pgs.

"American National Standard", Working Draft T10/1711-D, Revision 0.1, GTPP Standard # 30,(Aug. 26, 2004),79 pgs.

"American National Standard", Working Draft, Project 1532D vol. 2, Revision 4b, GTPP Standard # 31,(Apr. 21, 2004),247 pgs.

Office Action Dated Feb. 15, 2006 for U.S. Appl. No. 10/815,270.

Final Office action dated Jul. 18, 2006 for U.S. Appl. No. 10/815,270.

Notice of Allowance dated Dec. 8, 2006 for U.S. Appl. No. 10/815,270.

"Serial ATA II: Extensions to Serial ATA 1.0a", Revision 1.2, Table of Contents GTPP Standard # 22,(Aug. 27, 2004),4 pgs.

Weber, R. O., "Information Technology-SCSI Primary Commands-3(SPC-3)", Project T/10/1416-D, Revision 23, (May 4, 2005),62 pgs.

Office Action dated May 3, 2007 for U.S. Appl. No. 10/976,536.

"American National Standard for Information Technology-Fibre Channel- Physical and Signalling Interface-3 (FC-PH-3)", Developed by incits, Where IT all Begins, Table of Contents, GTPP Standard # 3,(1998),6 pgs.

"Working Draft American National Standard, Project T10/1601-D", Information Technology-Serial Attached SCSI- 1.1 (SAS-1.1): Revision 1, Table of Contents, GTPP Standard # 5,(Sep. 18, 2003),24 pgs.

"Serial ATA: High Speed Serialized AT Attachment, Serial ATA Workgroup", APT Technologies, Inc.: Revision 1.0a, Table of Contents, GTPP Standard # 4b,(Jan. 7, 2003),10 pgs.

"Working Draft, Project T10/1416-D", Revision 13: Information Technology-SCSI Primary Commands-3 (SPC-3), GTPP Standard # 10,(May 16, 2003),19 pgs.

* cited by examiner

INTEGRATED CIRCUIT CAPABLE OF PERSISTENT RESERVATIONS

FIELD

The present disclosure relates to an integrated circuit capable of persistent reservations.

BACKGROUND

In one conventional data storage arrangement, a computer node includes a host bus adapter (HBA). The HBA communicates with a data storage system via one or more communication links using a communication protocol associated with the one or more links. Target devices in the data storage system may include devices that communicate using different communication protocols. Certain communication protocols provide persistent reservations, which may permit exclusive access rights between an HBA and one or more devices in the data storage system. However, these communication protocols do not provide such persistent reservations for a plurality of device types, and will only provide persistent reservations or persistent affiliations for devices adhering to selected communication protocols. Thus, conventional data storage systems are incapable of providing persistent reservations for devices in a data storage system that may not adhere to a selected communication protocol. Thus, conventional data storage systems may limit the number of devices capable of persistent reservations.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
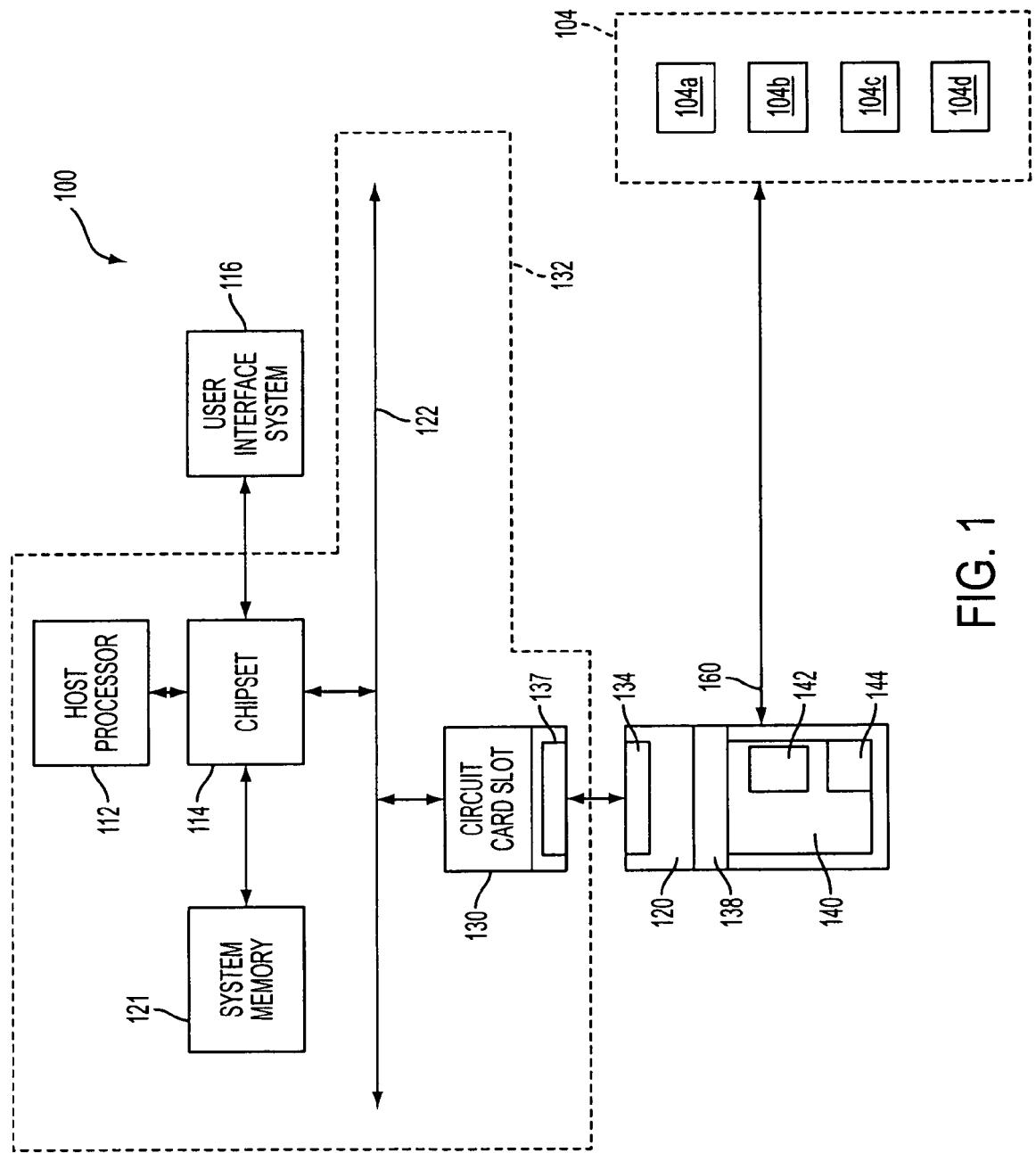
FIG. 1 is a diagram illustrating a system embodiment.

FIG. 1 illustrates a system embodiment 100 of the claimed subject matter. The system 100 may generally include a host system 132 which may include a host processor 112, a bus 122, a user interface system 116, a chipset 114, system memory 121, a circuit card slot 130, and a circuit card 120 that is capable of communicating with the mass storage 104. The host processor 112 may include any variety of processors known in the art such as an Intel® Pentium® IV processor commercially available from the Assignee of the subject application. The bus 122 may include various bus types to transfer data and commands. For instance, the bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 122 may also comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface 116 may include a variety of devices for human users to input commands and/or data and to monitor the system such as a keyboard, pointing device, and video display. The chipset 114 may include host bridge/hub system (not shown) that couples the processor 112, system memory 121, and user interface system 116 to each other and to the bus 122. Chipset 114 may include integrated circuit chips, such as those selected from integrated circuit chipsets commercially available from the assignee of the subject application (e.g., graphics memory and I/O controller hub chipsets), although other integrated circuit chips may also, or alternatively be used. The processor 112, system memory 121, chipset 114 and circuit card slot 130 may be integrated onto a motherboard. The processor 112, system memory 121, chipset 114 and circuit card slot 130 may comprise a host system 132.

The circuit card 120 may be constructed to permit it to be inserted into slot 130. When the circuit card 120 is properly inserted into slot 130, connectors 134 and 137 become electrically and mechanically coupled to each other. When connectors 134 and 137 are so coupled to each other, the card 120 becomes electrically coupled to bus 122 and may exchange data and/or commands with system memory 121, host processor 112, and/or user interface system 116 via bus 122 and chipset 114. Alternatively, without departing from this embodiment, the operative circuitry of the circuit card 120 may be included in other structures, systems, and/or devices. These other structures, systems, and/or devices may be, for example, in the motherboard 132, coupled to the bus 122. Processor 112, system memory 121, chipset 114, bus 122, and circuit card slot 130 may be comprised in a single circuit board. Alternatively, and without departing from this embodiment, circuit card 120 may comprise one or more chipsets comprised in a system motherboard.

The circuit card 120 may communicate with the mass storage 104 using a plurality of communication protocols. Circuit card 120 may comprise a host bus adaptor (HBA) which may be capable of exchanging commands and data between processor 112 and mass storage 104. The circuit card 120 may comprise at least one integrated circuit 140 capable of initiating communication between the host system 132 and the mass storage 104. The integrated circuit 140 may include circuitry that is capable of initiating communication between the host system 132 and the mass storage 104 to exchange data and/or commands therebetween. As used in any embodiment herein, "circuitry" may comprise, for example, singly or in any combination, hardwired circuitry, programmable circuitry, state machine circuitry, and/or firmware that stores instructions executed by programmable circuitry. Also, in any embodiment herein, circuitry may be embodied as, and/or form part of, one or more integrated circuits.

The circuit card 120 may also comprise memory 138. Memory 138 may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 138 may comprise other and/or later-developed types of computer-readable memory. Machine-readable firmware program instructions may be stored in memory 138. As described below, these instructions may be accessed and executed by integrated circuit 140. When executed by integrated circuit 140, these instructions may result in integrated circuit 140 performing the operations described herein as being performed by integrated circuit 140. Additionally, and as will be described in more detailed below, memory 138 and/or other memory (not shown) may be capable of storing data which may be associated with the operation of integrated circuit 140.

If a Fibre Channel (FC) protocol is used by circuit card 120 to exchange data and/or commands with mass storage 104, it may comply or be compatible with the interface/protocol described in "ANSI Standard Fibre Channel Physical and Signaling Interface-3 X3.303:1998 Specification." Alternatively or additionally, if a Serial ATA (SATA) protocol is used by controller circuit card 120 to exchange data and/or commands with mass storage 104, it may comply or be compatible with the protocol described in "Serial ATA: High Speed Serialized AT Attachment," Revision 1.0a, published on Jan. 7, 2003 by the Serial ATA Working Group and/or the protocol described in "Serial ATA II: Extensions to Serial ATA 1.0a," Revision 1.2, published Aug. 27, 2004 by the Serial ATA Working Group and/or earlier and/or later published versions of the SATA standard. Further additionally or alternatively, if a parallel ATA (PATA) is used by controller circuit card 120 to exchange data and/or commands with mass storage 104, it may comply or be compatible with the protocol described in "Information Technology—AT Attachment With Packet Interface—7 Volume 2—Parallel Transport Protocols and Physical Interconnect (ATA/ATAPI-7 V2)" Working Draft American National Standard of International Committee For Information Technology Standards (INCITS) T13 Technical Committee, Project 1532D, Volume 2, Revision 4b, published Apr. 21, 2004, by American National Standards Institute and/or earlier and/or later published versions. Further alternatively or additionally, if a Serial Attached Small Computer System Interface (SAS) protocol is used by controller circuit card 120 to exchange data and/or commands with mass storage 104, it may comply or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or earlier and/or later published versions of the SAS Standard. The SAS communication protocol may include one or more communication transport protocols, for example, Serial Advanced Technology Attachment (ATA) Tunneled Protocol (STP) and Serial Small Computer System Interface (SCSI) Protocol (SSP).

Integrated circuit 140 may comprise SAS initiator circuitry 142, which may be capable of generating one or more SCSI commands. "SCSI commands", as used in any embodiment herein, may comprise one or more commands as described in "Information Technology—SCSI Primary Commands—3 (SPC-3)" published on May 16, 2003 by the T10 Technical Committee of Accredited Standards Committee and/or earlier and/or later published versions, one or more commands as described in "Information Technology—Multimedia Commands—5 (MMC-5)" Working Draft American National Standard of International Committee For Information Technology Standards (INCITS) T10 Technical Committee, Project T10/1675-D, Revision 1, published Oct. 11, 2004, by American National Standards Institute and/or earlier and/or later published versions, and/or one or more commands as described in "Information Technology—SCSI Block Commands—2 (SBC-2)" Working Draft American National Standard of International Committee For Information Technology Standards (INCITS) T10 Technical Committee, Project T10/1417-D, Revision 14, published May 11, 2004, by American National Standards Institute and/or earlier and/or later published versions. In at least one embodiment described herein, initiator circuitry 142 may be capable of utilizing SSP transport protocol to communicate one or more SCSI commands.

Mass storage 104 may comprise one or more target ATA/ATAPI storage 104a, 104b, 104c and/or 104d. ATA/ATAPI devices comprised in mass storage 104 may also be capable of generating and/or receiving one or more ATA/ATAPI commands. "ATA/ATAPI commands", as used in any embodiment herein, may comply or be compatible with one or more commands described in "Information Technology—AT Attachment With Packet Interface—7 Volume 1—Register Delivered Command Set, Logical Register Set (ATA/ATAPI-7 V1)" Working Draft American National Standard of International Committee For Information Technology Standards (INCITS) T13 Technical Committee, Project 1532D, Volume 1, Revision 4b, published Apr. 21, 2004, by American National Standards Institute and/or earlier and/or later published versions. ATA/ATAPI commands may be transmitted to one or more ATA/ATAPI devices, or responses transmitted from one or more ATA/ATAPI devices, using the aforementioned SATA and/or PATA communications protocol. "ATA/ATAPI storage devices" or "ATA/ATAPI devices", as used herein, may include Serial ATA (SATA) capable of communicating using the aforementioned SATA communications protocol and/or parallel ATA (PATA) storage devices capable of communicating using the aforementioned PATA communications protocol, and/or any type of device that complies or is compatible with ATA/ATAPI commands. In this embodiment, ATA/ATAPI devices may include, for example, hard disk devices, CD-ROM devices, DVD-ROM/RAM devices and/or any type of devices that may comply or are compatible with the ATA/ATAPI commands. ATA/ATAPI devices comprised in mass storage 104 may comprise, individually or collectively, a clustered network storage environment. The network storage environment may comprise a SAS network.

Integrated circuit 140 may also comprise protocol translator circuitry 144 may be capable of translating between a first communication protocol and a second communication protocol. For example, protocol translator circuitry 144 may be capable of translating between SCSI commands, as may be generated by SAS initiator circuitry 142, and ATA/ATAPI commands, as may be utilized by one or more ATA/ATAPI devices 104a, 104b, 104c and/or 104d. Thus, for example, initiator engine 142 may generate one or more SCSI commands, and in response thereto, translator circuitry 144 may be capable of translating SCSI commands into corresponding ATA/ATAPI commands and transmitting the ATA/ATAPI commands to one or more ATA/ATAPI devices comprised in mass storage 104 via communications link 160. Of course, in this embodiment, translator circuitry 144 may also be capable of translating in the reverse direction, i.e., ATA/ATAPI responses (as may be generated by one or more ATA/ATAPI devices 104a, 104b, 104c, and/or 104d) into corresponding SCSI responses. Protocol translation circuitry 156 may be translating SCSI commands into ATA/ATAPI commands (and ATA/ATAPI commands into SCSI commands) using translation protocols as described in "Working Draft SCSI/ATA Translation (SAT)," Working Draft American National Standard of International Committee For Information Technology Standards (INCITS) T10 Technical Committee, Project T10/1711-D, Revision 0.1, published Aug. 26, 2004, by American National Standards Institute and/or earlier and/or later published versions.

Host system 132 may be capable of exchanging SCSI commands with circuit card 120 (via, for example, bus 122) to permit the host system 132 to exchange commands and data with one or more target devices comprised in mass storage 104. In response thereto, at least in part, SAS initiator circuitry 142 may be capable of generating SCSI commands to enable, for example, SCSI commands between circuit card 120 and one or more target ATA/ATAPI devices. Protocol translation circuitry 144 may be capable of receiving SCSI commands which may be targeted for one or more devices coupled to circuit card 120, and translating SCSI commands into the equivalent ATA/ATAPI commands. One exemplary SCSI command may include persistent reservations. A persistent reservation may be defined, for example, between one or more ATA/ATAPI devices comprised in the mass storage 104 and one or more initiator engines 142. "Persistent reservations", as used in any embodiment herein, may comprise one or more SCSI Primary Commands capable of reserving one or more devices for one or more initiator engines 142. Also, "persistent reservations", as used in any embodiment herein, may mean that reservations, as may be defined by the aforementioned T10 standard, may be maintained across power cycles (i.e., reset and/or reboot events occurring at the circuit card 120 and/or one or more ATA/ATAPI devices). A "reservation" may mean initiator engine 142 may be granted exclusive access to an entire ATA/ATAPI device, or certain portions of a ATA/ATAPI device. Alternatively, reservations may mean that an initiator engine 142 is granted limited exclusive access, read-only access, write only access, and/or other reservations as may be defined in the aforementioned T10 standard. Of course, SAS initiator engine 142 may be capable of other operations (for example, generating other SCSI commands, for example, shared clustering context commands) as may be defined in the aforementioned SCSI SBC-2, SBC-3 and/or MMC commands without departing from this embodiment.

Conventional ATA/ATAPI devices do not support persistent reservations. Accordingly, in this embodiment, the protocol translation circuitry 144 may be capable of receiving SCSI commands to provide persistent reservations for one or more ATA/ATAPI devices (e.g., 104*a*, 104*b*, 104*c*, and/or 104*d*), and generating corresponding STP commands to permit conventional ATA/ATAPI devices to support persistent reservations. For example, in response to a SCSI command as may be generated by host 132, SAS initiator circuitry 142 may be capable of generating a SCSI "Persistent Reserve IN/OUT" command set to enable a persistent reservation between initiator engine 142 and one or more target ATA/ATAPI devices in mass storage 104. Protocol translator circuitry 144 may be capable of translating a SCSI "Persistent Reserve IN/OUT" commands into a corresponding ATA/ATAPI commands, for example, an ATA "READ/WRITE LOG" request for a target ATA/ATAPI device. The "READ/WRITE LOG" commands may be used to provide persistent reservations between, SAS initiator 142 and one or more ATA/ATAPI devices comprised in mass storage 104.

Figure 4:
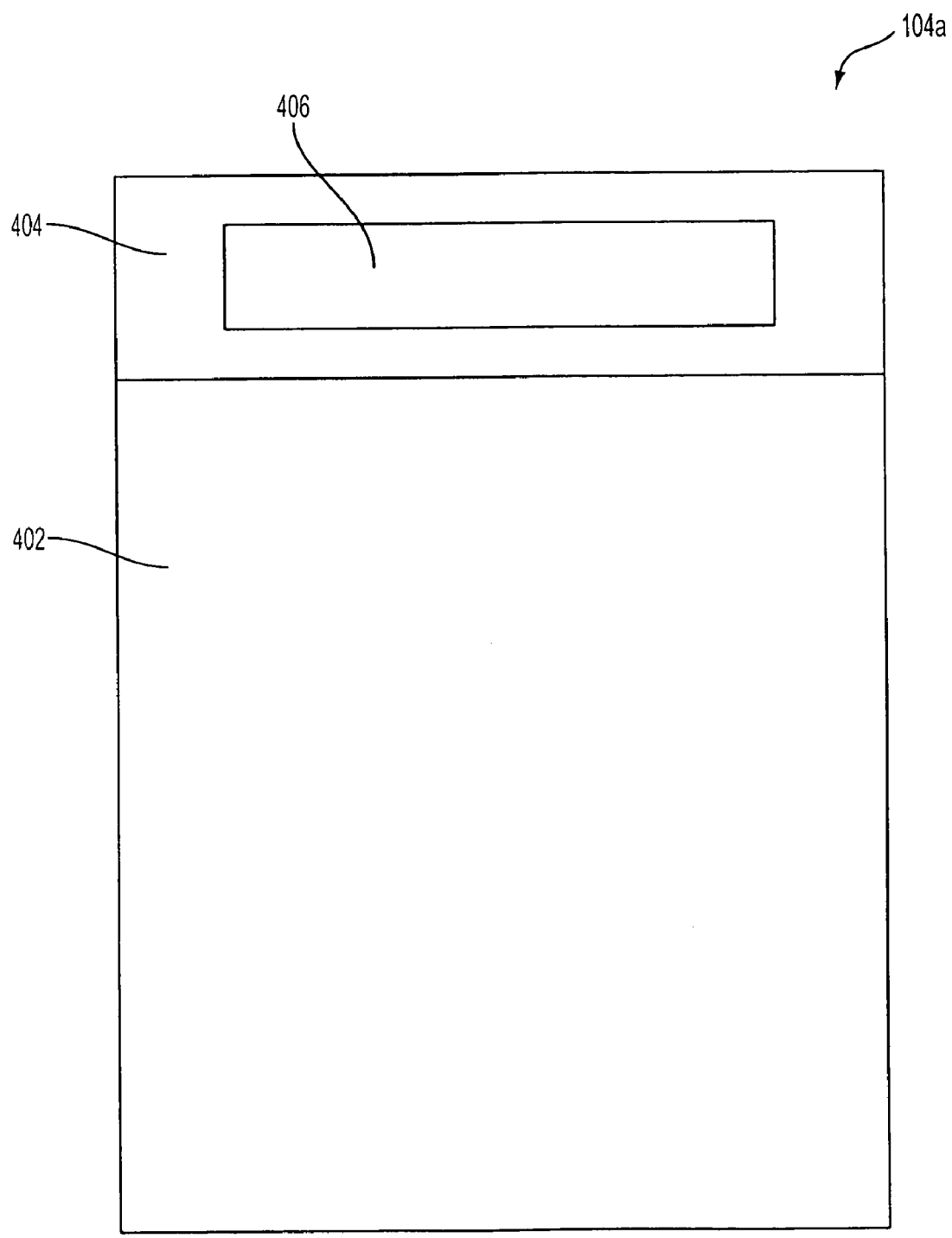
FIG. 4 is a diagram illustrating an exemplary storage device.

FIG. 4 depicts an exemplary block diagram of one exemplary target ATA/ATAPI device 104*a*. The device 104*a* may comprise a data portion 402 and a Log Page portion 404. The Log Page portion may include a reserved segment 406 that is specifically reserved for one or more instructions from one or more host systems, such as host system 132. In one embodiment, persistent reservation information, as described herein, may be stored in the reserved segment 406. To enable access to the Log Page portion 404 and/or the reserved segment 406, ATA/ATAPI device 104*a* may also comply or be compatible with ATA/ATAPI commands which may include SMART (Self-Monitoring and Reporting Technology) and Host Protected Area Feature. These commands may enable, for example, host system 132 to have read/write access to the Log Page portion of the device to permit, for example and as described herein, persistent reservations to be defined for a given ATA/ATAPI device In operation, READ/WRITE LOG commands, as described above, may be used to determine if a persistent reservation exists for a given ATA/ATAPI device and/or to establish a persistent reservation with a target ATA/ATAPI device. For example, protocol translator circuitry 144, upon receiving a SCSI "Persistent Reserve IN/OUT" command set may generate a READ LOG command to a target ATA/ATAPI device to read the Log Page data contained thereon. Protocol translator circuitry 144 may also be capable of determining if any persistent reservation data is written into the Log Page. Likewise, protocol translator circuitry 144, in response to a SCSI "Persistent Reserve IN/OUT" command set, may be capable of generating a WRITE LOG command to a target ATA/ATAPI device to write a persistent reservation into the Log Page data portion 404 of the device. In this manner, protocol translator circuitry 144 may be capable of discovering persistent reservations stored on a target ATA/ATAPI device using subsequent READ LOG commands. Alternatively or additionally, persistent reservation data stored in the Log Page portion 404 of one or more target ATA/ATAPI devices may be cached locally in memory 138 to permit, for example, integrated circuit 140 to access to persistent reservation data without reading persistent reservation data from one or more target ATA/ATAPI devices (and thus, subsequent READ LOG commands may be omitted). Storing persistent reservation data in the Log Page portion 404 of one or more target ATA/ATAPI devices may permit, for example, the ATA/ATAPI device to be disconnected from the system 100 and moved to another system environment while preserving reservations between one or more initiator engines Alternatively or additionally persistent reservations may be stored as machine readable metadata, for example, on the data portion 402 of an ATA/ATAPI device. Integrated circuit 140 may be capable of determining the type of device present and further may be capable of parsing the SATA register frame information structure (FIS) to determine if data (such as metadata) is present on the device, and if such data represents persistent reservations. Likewise, storing persistent reservation data as metadata in the data portion 402 of one or more target ATA/ATAPI devices may permit, for example, the ATA/ATAPI device to be disconnected from the system 100 and moved to another system environment while preserving reservations between one or more initiator engines This embodiment equally contemplates that devices other than ATA/ATAPI compliant devices may be coupled to circuit card 120 (for example SAS compliant devices and/or FC compliant devices), and may augment the cluster of ATA/ATAPI devices and/or form additional clusters. Integrated circuit 140 may be capable of bypassing translation circuitry 144 to exchange commands and data with one or more SAS and/or FC compliant devices coupled thereto, and to permit communication between circuit card 120 and SAS and/or FC compliant devices coupled to the circuit card 120.

Figure 2:
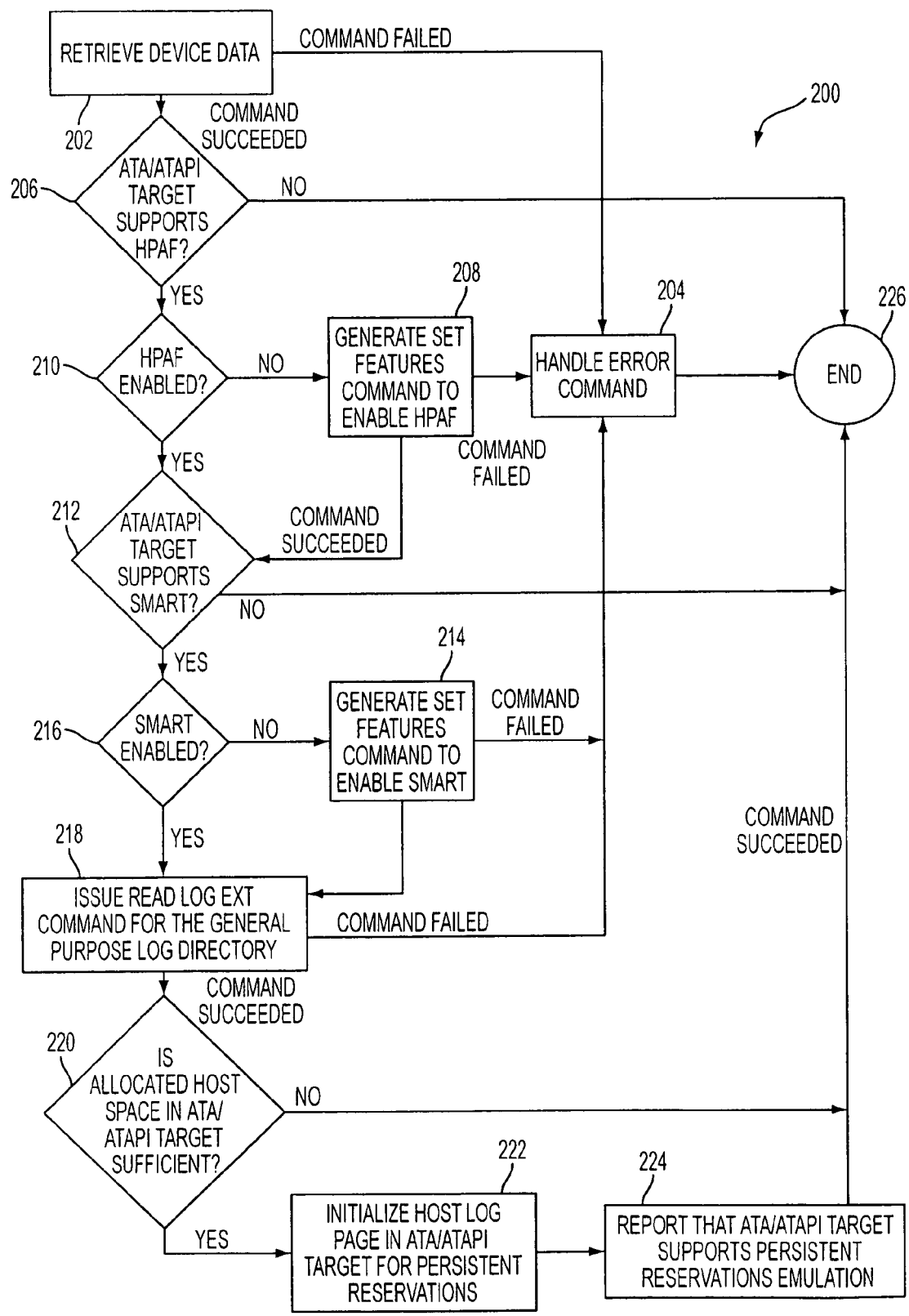
FIG. 2 is a diagram illustrating exemplary operations according to one embodiment.

FIG. 2 depicts a diagram 200 illustrating operations which may be performed by an embodiment. In FIG. 4, certain portions of the system 100 depicted in FIG. 1 and the target ATA/ATAPI device 104*a* depicted in FIGS. 1 and 4 have been omitted for clarity (for example circuit board 132 and circuit card 120), but it is to be understood that the operations depicted in FIG. 2 can be implemented in a manner consistent with an embodiment depicted in FIGS. 1 and/or 4, or alternatively in other system implementations, without departing from this embodiment. The following description of the diagram 400 of FIG. 4 shall make specific reference to operations for initializing an ATA/ATAPI device (for example device 104*a*) to discover if the target ATA/ATAPI device complies or is compatible with persistent reservations commands as may be generated by initiator circuitry 142. However, it should be understood that the following description can apply to any ATA/ATAPI device, whether or not comprised in mass storage 106, which may include, for example, a direct-attached ATA/ATAPI device which may be coupled directly to circuit card 120.

In this exemplary embodiment, assume that integrated circuit 140 initiates communication with target ATA/ATAPI device 104*a* using the aforementioned SATA and/or PATA communications protocol. Operations may include generating commands to the ATA/ATAPI device 104*a* to retrieve device data 202. If the commands are successful, operations may also include determining if the target ATA/ATAPI device supports the ATA command set Host Protect Area Feature (HPAF) 206. If not, operations may end 226, and integrated circuit 140 may store information related to the status of the ATA/ATAPI device 104*a* in memory 138 and/or report that the target ATA/ATAPI device 104*a* is incapable of supporting persistent reservations to, for example, host system 132. If the target ATA/ATAPI device supports HPAF, operations may also include determining if HPAF is enabled 210. If not, operations may include generating an ATA/ATAPI SET FEATURES command to enable HPAF in the target ATA/ATAPI device 208. If the SET FEATURES command fails, operations may include handling the error command 204 and ending operations 226. If the SET FEATURES command succeeds, operations may also include determining if the target ATA/ATAPI device supports the ATA command set SMART 212. If not, operations may end 226, and integrated circuit 140 may store information related to the status of the ATA/ATAPI device 104*a* in memory 138 and/or report that the target ATA/ATAPI device 104*a* is incapable of supporting persistent reservations to, for example, host system 132. Operations may also include determining if SMART is enabled 216. If not, operations may include generating a SATA SET FEATURES command to enable SMART in the target ATA/ATAPI device 214. If the SET FEATURES command fails, operations may include handling the error command 204 and ending operations 226.

If the SMART and HPAF are enabled, operations may also include generating a READ LOG EXT command for the general purpose log directory of the target ATA/ATAPI device 218. This operation may permit, for example, integrated circuit 140 to inspect the log Page portion and/or the reserved host space portion of the target ATA/ATAPI device. If this operation fails, operations may include handling the error command 204 and ending operations 226. If successful, operations may also include determining if allocated reserved host space is sufficient to allow for persistent reservations data to be stored therein 220. If this operation fails, operations may include handling the error command 204 and ending operations 226. If operation 220 is successful, i.e., if it is determined that there exists sufficient space in the reserved host space to support persistent reservations data, operations may further include generating commands to initialize the Host Log Page in the ATA/ATAPI target to support persistent reservations 222. Alternatively, with respect to these operations, if it is determined that the Host Log Page has already been initialized to support persistent reservations, initialization operations may cease, and may further proceed to operations described below. Operations may further include reporting that the ATA/ATAPI target supports persistent reservations emulation in the Host Log Page 224.

Figure 3:
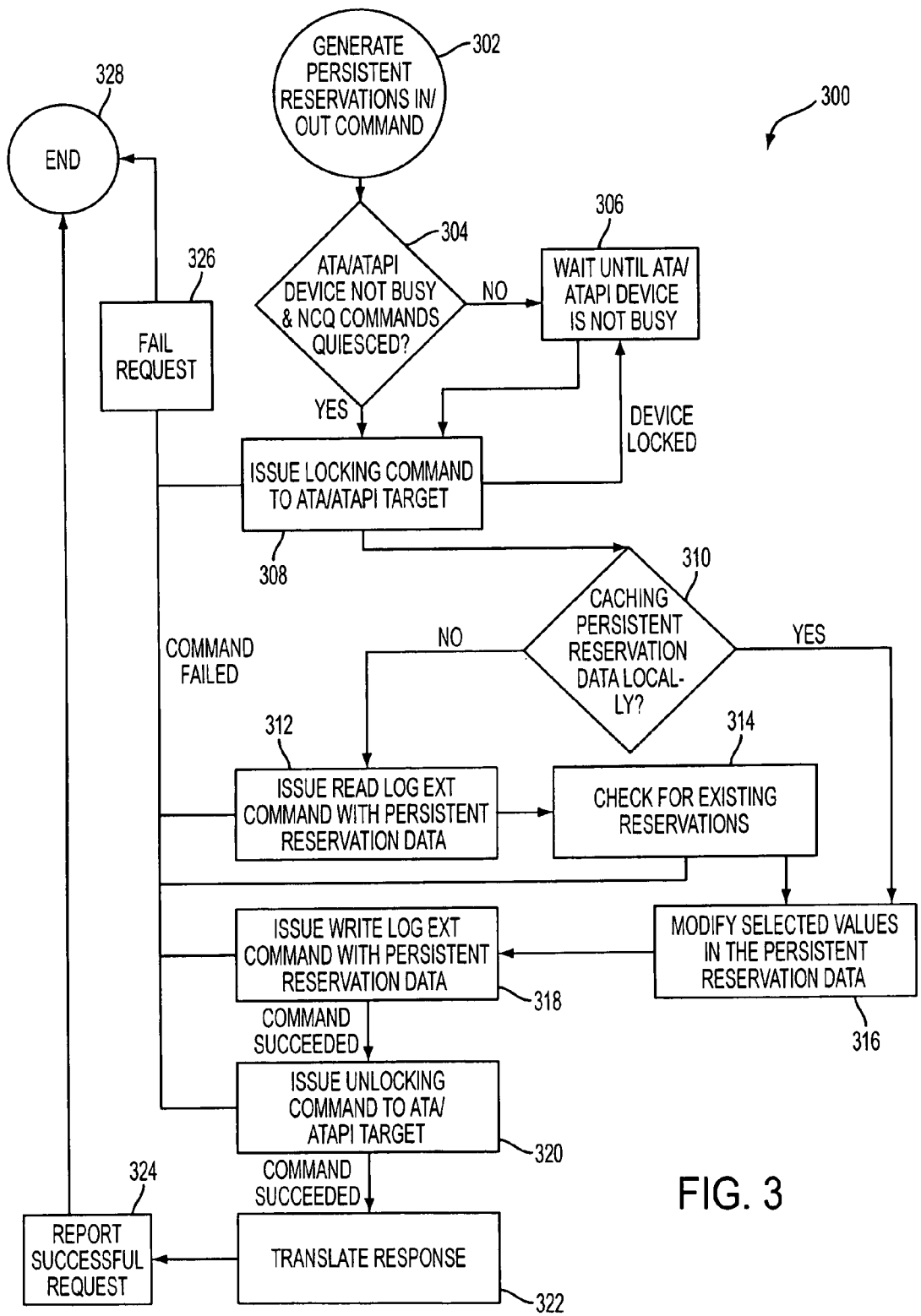
FIG. 3 is a diagram illustrating exemplary operations according to one embodiment.

FIG. 3 depicts a diagram 300 illustrating operations which may be performed by an embodiment. In FIG. 3, certain portions of the system 100 depicted in FIG. 1 and the target ATA/ATAPI device 104*a* depicted in FIGS. 1 and 4 have been omitted for clarity (for example circuit board 132 and circuit card 120), but it is to be understood that the operations depicted in FIG. 3 can be implemented in a manner consistent with an embodiment depicted in FIGS. 1 and/or 4, or alternatively in other system implementations, without departing from this embodiment. The following description of the diagram 300 of FIG. 3 shall make specific reference to operations for creating persistent reservations between a target ATA/ATAPI device (for example device 104*a*) and an initiator engine (for example, initiator engine 142). Further, this embodiment is intended to stand alone from the discovery and initialization operations referred to in the embodiment of FIG. 2, and as such it is contemplated herein that operations of FIG. 3 may or may not be preceded by operations of FIG. 2.

In this exemplary embodiment, assume that integrated circuit 140 initiates communication with a target ATA/ATAPI device 104*a* using the aforementioned SATA and/or PATA communications protocol. Operations may include generating a SCSI Persistent Reservations IN/OUT Command 302. In one embodiment, the SCSI Persistent Reservations IN/OUT may be generated by, for example, host system 132, to establish a persistent reservation between initiator engine 142 and target ATA/ATAPI device 104*a*. Operations may also include determining if the ATA/ATAPI device is busy and if Native Command Queing (NCQ) commands have settled (quiesced) 304, and if not, waiting until the SATA device is not busy 306. When the ATA/ATAPI device is available, operations may further include issuing a lock command to the target ATA/ATAPI device 308. One exemplary lock command may include an ATA/ATAPI-7 SET MAX LOCK command, which may be operable to provide exclusive access between, for example integrated circuit 140 and the ATA/ATAPI target device. The lock command may prevent other initiators from accessing the target ATA/ATAPI device until released by the integrated circuit. The lock command may also operate to prevent other transactions with the target ATA/ATAPI device until a persistent reservation is established.

Operations may further include determining if persistent reservation data is cached locally (i.e., data written to memory) or stored on one or more target ATA/ATAPI devices 310. If persistent reservation data is stored on a target ATA/ATAPI device and not cached locally, operations may include issuing a READ LOG EXT command to read the Log 312. Operations may further include checking, based on one or more data values contained in the Log, for existing persistent reservations 314 (and if such a persistent reservation exists, issuing a failed command request 326 and ending operations 328). Operations may further include modifying selected values in the persistent reservation data 316. If persistent reservations data is cached locally, operations 312 and 314 may be omitted and operations may proceed to modifying selected values in the persistent reservation data 316. To create a new persistent reservation, operations may include issuing a WRITE LOG EXT command to write the persistent reservation data into the Log 318. Operations may also include issuing an unlock command to the target ATA/ATAPI device 320, translating the response from the target ATA/ATAPI device 322 and reporting a successful persistent reservation request 324. One exemplary unlock command may include an ATA/ATAPI-7 SET MAX UNLOCK command, which may be operable to release exclusive access between, for example, integrated circuit 140 and the ATA/ATAPI target device. This may also permit other initiators to access the target SATA device.

Although embodiments herein describe creating persistent reservations for ATA/ATAPI devices, it should be understood that this disclosure may also provide persistent reservations for SAS devices that do not support persistent reservations and/or persistent affiliations. Also, the expander device may be capable of creating persistent reservations and/or persistent affiliations between one or more initiator engines and one or more ATA/ATAPI devices. Also, embodiments herein describe the functionality of the integrated circuit 140 for creating and maintaining persistent reservations, however, it should be understood that other integrated circuits may be capable of such functionality, for example, integrated circuits comprised in circuit card 120 and/or host system 132.

Also, "persistent reservations", as used in any embodiment herein, may mean that reservations, as may be defined by the aforementioned SCSI T10 standard, may be maintained across power cycles (i.e., reset and/or reboot events occurring at the circuit card 120 and one or more ATA/ATAPI devices). Further, in an embodiment where more than one initiator engine is present (for example, in a multiple host system embodiment), persistent reservations may be used to define reservation between one of a plurality of initiator engines and one target ATA/ATAPI device.

Thus, in summary, at least one embodiment herein may provide an integrated circuit that may be capable of communicating with at least one target ATA/ATAPI storage device. The integrated circuit of this embodiment may be capable of creating a persistent reservation between at least one target ATA/ATAPI storage device and the integrated circuit.

A system embodiment may provide at least one circuit card comprising an integrated circuit capable of communicating in accordance with a plurality of different communication protocols. The at least one circuit card may be capable of being coupled to a bus. The integrated circuit may be capable of communicating with at least one target ATA/ATAPI storage device, and the integrated circuit may be further capable of creating a persistent reservation between at least one target ATA/ATAPI storage device and the integrated circuit.

Thus, for example, it may be possible to use the integrated circuit of these embodiments to communicate directly via one or more communication links with one or more devices in SAS and/or SATA protocol domains in the mass storage system, without having to employ one or more external communication protocol converters, translators, and/or expanders (such as, for example, one or more SAS expanders) coupled between the integrated circuit and the data storage system, although such protocol converters, translators, and/or expanders may be used without departing from these embodiments. Advantageously, these features may permit the integrated circuit of these embodiments to exhibit enhanced versatility and utility compared to the prior art, and may reduce design costs of employing this integrated circuit compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method, comprising:
communicating, by an integrated circuit, with at least one target ATA/ATAPI storage device;
creating, by said integrated circuit, a persistent reservation between at least one said target ATA/ATAPI storage device and said integrated circuit;
determining if said at least one target ATA/ATAPI storage device supports a Host Protect Area Feature ATA command set and a Self-Monitoring and Reporting (SMART) ATA command set, said Host Protect Area Feature ATA command set and said SMART ATA command set configured to enable a host system to have read/write access to a log page portion of said at least one ATA/ATAPI storage device to permit said persistent reservation to be defined for said at least one ATA/ATAPI storage device;
inspecting said log page portion and a reserved space portion of said target ATA/ATAPI storage device; and
determining if said reserved space portion is sufficient to store said persistent reservation data.

2. The method of claim 1, further comprising:
retrieving, by said integrated circuit, said log page portion of said target ATA/ATAPI storage device and writing, by said integrated circuit, persistent reservation data into said log page portion of said target ATA/ATAPI storage device.

3. The method of claim 2, further comprising:
writing, by said integrated circuit, said persistent reservation data into said reserved host space.

4. The method of claim 1, further comprising:
writing, by said integrated circuit, persistent reservation data as metadata into said target ATA/ATAPI storage device.

5. The method of claim 4, further comprising:
generating, by said integrated circuit, a SCSI persistent reservation command and translating, by said integrated circuit, said SCSI persistent reservation command to at least one ATA command.

6. The method of claim 5, wherein:
said SCSI persistent reservation command comprising a persistent reservations IN/OUT command, and said ATA/ATAPI command comprising a READ/WRITE LOG command.

7. The method of claim 1, further comprising:
issuing, by said integrated circuit, a lock command to said target ATA/ATAPI storage device before creating said persistent reservation, said lock command providing exclusive access between said target ATA/ATAPI storage device and said integrated circuit.

8. The method of claim 7, wherein:
said lock command comprising ATA/ATAPI SET MAX LOCK command.

9. The method of claim 1, further comprising:
issuing, by said integrated circuit, an unlock command to said target ATA/ATAPI storage device after creating said persistent reservation, said unlock command releasing exclusive access between said target ATA/ATAPI storage device and said integrated circuit.

10. The method of claim 9, wherein:
said unlock command comprising ATA/ATAPI SET MAX UNLOCK command.

11. An apparatus, comprising:
an integrated circuit configured to communicate with at least one target ATA/ATAPI storage device, said integrated circuit further configured to create a persistent reservation between at least one said target ATA/ATAPI storage device and said integrated circuit, said integrated circuit further configured to determine if said at least one target ATA/ATAPI storage device supports a Host Protect Area Feature ATA command set and a Self-Monitoring and Reporting (SMART) ATA command set, said integrated circuit further configured to inspect a log page portion and a reserved space portion of said target ATA/ATAPI storage device, said integrated circuit being further configured to determine if said reserved space portion is sufficient to store said persistent reservation data, said Host Protect Area Feature ATA command set and said SMART ATA command set configured to enable a host system to have read/write access to said log page portion of said at least one ATA/ATAPI storage device to permit said persistent reservation to be defined for said at least one ATA/ATAPI storage device.

12. The apparatus of claim 11, wherein:
said integrated circuit is further configured to retrieve said log page portion of said target ATA/ATAPI storage device and write persistent reservation data into said log page portion of said target ATA/ATAPI storage device.

13. The apparatus of claim 12, wherein:
said integrated circuit is configured to write said persistent reservation data into said reserved space portion.

14. The apparatus of claim 11, wherein:
said integrated circuit is further capable of writing persistent reservation data as metadata into a data portion of said target ATA/ATAPI storage device.

15. The apparatus of claim 11, wherein:
said initiator engine circuitry is capable of generating a SCSI persistent reservation command and said integrated circuit is capable of translating said SCSI persistent reservation command to at least one ATA/ATAPI command.

16. The apparatus of claim 15, wherein:
said SCSI persistent reservation command comprising a persistent reservations IN/OUT command, and said ATA/ATAPI command comprising a READ/WRITE LOG command.

17. The apparatus of claim 11, wherein:
said integrated circuit is further capable of issuing a lock command to said target ATA/ATAPI storage device prior to creating said persistent reservation, said lock command providing exclusive access between said target ATA/ATAPI storage device and said integrated circuit.

18. The apparatus of claim 17, wherein:
said lock command comprising ATA/ATAPI SET MAX LOCK command.

19. The apparatus of claim 11, wherein:
said integrated circuit is further capable of issuing an unlock command to said target ATA/ATAPI storage device after creating said persistent reservation, said unlock command releasing exclusive access between said target ATA/ATAPI storage device and said integrated circuit.

20. The apparatus of claim 19, wherein:
said unlock command comprising ATA/ATAPI SET MAX UNLOCK command.

21. A system, comprising:
at least one circuit card comprising an integrated circuit configured to communicate in accordance with a plurality of different communication protocols, said at least one circuit card being configured to be coupled to a bus, said integrated circuit is configured to communicate with at least one target ATA/ATAPI storage device, said integrated circuit further configured to create a persistent reservation between at least one said target ATA/ATAPI storage device and said integrated circuit, said integrated circuit further configured to determine if said at least one target ATA/ATAPI storage device supports a Host Protect Area Feature ATA command set and a Self-Monitoring and Reporting (SMART) ATA command set, said integrated circuit further configured to inspect a log page portion and a reserved space portion of said target ATA/ATAPI storage device, said integrated circuit being further configured to determine if said reserved space portion is sufficient to store said persistent reservation data, said Host Protect Area Feature ATA command set and said SMART ATA command set configured to enable a host system to have read/write access to said log page portion of said at least one ATA/ATAPI storage device to permit said persistent reservation to be defined for said at least one ATA/ATAPI storage device.

22. The system of claim 21, wherein:
said integrated circuit is further configured to retrieve a log page portion of said target ATA/ATAPI storage device and to write persistent reservation data into said log page portion of said target ATA/ATAPI storage device.

23. The system of claim 22, wherein:
said integrated circuit is configured to write said persistent reservation data into said reserved space portion.

24. The system of claim 21, wherein:
said integrated circuit is further configured to write persistent reservation data as metadata into said target ATA/ATAPI storage device.

25. The system of claim 24, wherein:
said integrated circuit is capable of generating a SCSI persistent reservation command and said integrated circuit is capable of translating said SCSI persistent reservation command to at least one ATA/ATAPI command.

26. The system of claim 25, wherein:
said SCSI persistent reservation command comprising a persistent reservations IN/OUT command, and said ATA/ATAPI command comprising a READ/WRITE LOG command.

27. The system of claim 21, wherein:
said integrated circuit is further capable of issuing a lock command to said target ATA/ATAPI storage device prior to creating said persistent reservation, said lock command providing exclusive access between said target ATA/ATAPI storage device and said integrated circuit.

28. The system of claim 27, wherein:
said lock command comprising ATA/ATAPI SET MAX LOCK command.

29. The system of claim 21, wherein:
said integrated circuit is further capable of issuing an unlock command to said target ATA/ATAPI storage device after creating said persistent reservation, said unlock command releasing exclusive access between said target ATA/ATAPI storage device and said integrated circuit.

30. The system of claim 29, wherein:
said unlock command comprising ATA/ATAPI SET MAX UNLOCK command.

31. An article comprising:
a storage medium having stored thereon instructions that when executed by a machine result in the following operations;
communicating, by an integrated circuit, with at least one target ATA/ATAPI storage device;
creating, by said integrated circuit, a persistent reservation between at least one said target ATA/ATAPI storage device and said integrated circuit;

determining if said at least one target ATA/ATAPI storage device supports a Host Protect Area Feature ATA command set and a Self-Monitoring and Reporting (SMART) ATA command set, said Host Protect Area Feature ATA command set and said SMART ATA command set configured to enable a host system to have read/write access to a log page portion of said at least one ATA/ATAPI storage device to permit said persistent reservation to be defined for said at least one ATA/ATAPI storage device;

inspecting said log page portion and a reserved space portion of said target ATA/ATAPI storage device; and determining if said reserved space portion is sufficient to store said persistent reservation data.

32. The article of claim 31, wherein said instructions that when executed by said machine result in the following additional operations:

retrieving, by said integrated circuit, said log page portion of said target ATA/ATAPI storage device and writing, by said integrated circuit, persistent reservation data into said log page portion of said target ATA/ATAPI storage device.

33. The article of claim 32, further comprising:

writing, by said integrated circuit, said persistent reservation data into said reserved space portion.

34. The article of claim 31, wherein said instructions that when executed by said machine result in the following additional operations:

writing, by said integrated circuit, persistent reservation data as metadata into said target ATA/ATAPI storage device.

35. The article of claim 34, wherein said instructions that when executed by said machine result in the following additional operations:

generating, by said integrated circuit, a SCSI persistent reservation command and translating, by said integrated circuit, said SCSI persistent reservation command to at least one ATA/ATAPI command.

36. The article of claim 35, wherein:

said SCSI persistent reservation command comprising a persistent reservations IN/OUT command, and said ATA/ATAPI command comprising a READ/WRITE LOG command.

37. The article of claim 31, wherein said instructions that when executed by said machine result in the following additional operations:

issuing, by said integrated circuit, a lock command to said target ATA/ATAPI storage device before creating said persistent reservation, said lock command providing exclusive access between said target ATA/ATAPI storage device and said integrated circuit.

38. The article of claim 37, wherein:

said lock command comprising ATA/ATAPI SET MAX LOCK command.

39. The article of claim 31, wherein:

said instructions that when executed by said machine result in the following additional operations:

issuing, by said integrated circuit, an unlock command to said target ATA/ATAPI storage device after creating said persistent reservation, said unlock command releasing exclusive access between said target ATA/ATAPI storage device and said integrated circuit.

40. The article of claim 39, wherein:

said unlock command comprising ATA/ATAPI SET MAX UNLOCK command.

* * * * *